Patented Dec. 28, 1948

2,457,719

UNITED STATES PATENT OFFICE 2,457,719

PREPARATION OF EXTRUDED IRON OXIDE CATALYSTS

Paul R. Pine, Berea, and Earl C. Ray, Cleveland, Ohio, assignors to The Harshaw Chemical Company, Elyria, Ohio, a corporation of Ohio No Drawing. Substituted for application Serial No. 716,436, filed December 14, 1946. This application filed April 3, 1947, Serial No. 739,267

4 Claims. (Cl. 252—259.2)

This invention relates to the preparation of extruded catalytic bodies suitable for various purposes such as hydrogenation and dehydrogenation, hydrogen production, ammonia synthesis and the like and has more particular reference to catalysts having iron oxide as the principal constituent and having other catalytic materials carried thereby or incorporated therewith. Prior to our invention, various catalysts have been made having iron oxide as the principal constituent of the final product, or acting as a carrier and having incorporated therewith various catalytic metals or their oxides, with or without promoters. Accordingly, we do not claim such compositions broadly nor the use thereof but only the herein described improvements in the process of making catalysts of the type indicated.

We have now discovered that a superior catalytic product can be produced by first forming a paste or green catalyst principally consisting of ferrous carbonate (by which term we understand normal and basic ferrous carbonate and mixtures thereof) and having admixed therewith, or incorporated therein, suitable proportions of various catalytic metals such as copper, vanadium, nickel, cobalt and the like, being the elements of the middle portion of the first long series of the periodic table, that is, the elements of atomic numbers 22 to 30 inclusive (iron itself being excluded) with or without promoters which may be compounds of alkali metals such as the hydroxides or carbonates of lithium, sodium and potassium, together with sufficient water to impart correct plasticity for extrusion, extruding the resulting mixture to form bodies of desired shape and size, drying the resulting material and calcining to drive off the carbon dioxide content of the ferrous carbonate and bring to completion any reactions occurring between the constituents. An extrusion lubricant is also desirable as a constituent of the paste or green catalyst. Any suitable extrusion lubricant which will burn out on calcination may be employed, for example low viscosity lubricating oils, starch or the like. As above indicated, the catalytic metals and promoters, if the same are used, may be in the form of various compounds but preferably are compounds such as on calcination will yield the oxide. For example, hydroxides are suitable as well as carbonates, acetates, formates and nitrates. The iron, present as ferrous carbonate, will very largely determine the extrusion characteristics of the paste.

Ferrous carbonate of suitable purity can be produced by precipitation from a solution of ferrous sulfate by means of sodium carbonate, precipitation being carried out preferably on the alkaline side. The precipitate should be washed and at least partially dried before proceeding further. The dried or partially dried ferrous carbonate may then be mixed with the catalytic metal compound and promoter if any as well as such quantity of water and lubricant as required to give suitable plasticity for extrusion. Alternatively the catalytic metal compound or the promoter may be coprecipitated or wet-mixed with the ferrous carbonate in the form of the respective carbonates and the other admixed therewith after the precipitate is separated from the reaction mixture along with water and lubricant if the latter are required. The degree of plasticity is somewhat a matter of choice, but in general we prefer to employ a quantity of water not much greater than the minimum required to allow the material to be extruded.

Obviously the proportions of catalyst and promoter will vary according to the use for which the final product is intended. The total weight of catalyst including the catalytic metal of atomic number 22 to 30 inclusive, and the alkali metal promoter should be such that the combined oxides of catalytic metal and promoter in the final product are from 2% to 30% of the total weight of the final product. This will give a paste wherein the ferrous carbonate will predominate over the other ingredients in the paste sufficiently to obtain the benefits of the invention in the extrusion of the paste in the drying and calcination steps. Within the above indicated limits wherein the constituents of the paste are such that in the final calcined product the iron oxide may constitute from 70% to 99% of the total weight of the catalyst, we prefer to employ ingredients such as will produce in the final product from 2% to 20% by weight of the oxide of the catalytic metal of atomic number from 22 to 30 both inclusive, and from 0 to 28% of the oxide of a metal of the class consisting of lithium, sodium and potassium, the total constituents other than iron oxide not exceeding 30% by weight, percentages being based upon the total weight of the final product.

After extrusion the catalytic material is dried at a low temperature, for example, 110° C. (suitably from 110° C. to 150° C. in air) until substantially free from uncombined water. The so-dried material, probably a highly basic ferrous carbonate in admixture with the catalytic compound or compounds, should then be calcined at a temperature in the order of 900 to 950° C. The material may be placed in a kiln and brought up to about 900° C. to 950° C. at a rate to expel the uncombined water before a temperature of 150° C. is reached and held in that temperature range (900° C. to 950° C.) for two hours or more, suitably from two to six hours. The result is the expulsion of carbon dioxide at a rate which does not cause disintegration of the extruded shape, a marked shrinkage in volume occurring in the high temperature portion of the firing and the production of a catalytic product which is relatively quite dense but which, surprisingly, possesses a catalytic activity at least equivalent to and sometimes even higher than is obtained from some less dense products produced by the use of iron oxide as the starting material instead of ferrous carbonate.

We are not certain of the exact nature of the physical changes which take place in the course of the production of our improved catalyst but we believe that in the course of drying the extruded shape, the escape of moisture and a small proportion of carbon dioxide gas resulting from the breakdown of a portion of the iron carbonate produce minute channels which allow the remaining carbon dioxide content of the ferrous carbonate to escape during later calcination without disintegration or weakening of the extruded shapes.

We have found that catalysts so produced are very active and according to the composition very effective in the various reactions for which iron oxide base catalysts have been found suitable. A number of examples of specific catalyst compositions are set forth below and the method of manufacture thereof is indicated.

Example I

A water solution containing 1419 lbs. of $FeSO_4.7H_2O$ was aded to a water solution containing 645 lbs. of soda ash, resulting in a precipitate of 580 lbs. of ferrous carbonate ($FeCO_3$). The precipitate was washed and dried. A quantity of the resulting ferrous carbonate sufficient to yield 126 lbs. of $Fe_2O_3$ was mixed with 6.75 lbs. of $Ni(NO_3)_2$. To this mixture was added a solution consisting of 6 gallons of water having dissolved therein 16.6 lbs. of KOH and 0.938 lbs. of lubricating oil. The water content was then adjusted to give correct plasticity for extrusion and the material was extruded through a 3/16" die. The extruded material was then dried at 110° C. and then calcined in a temperature range between 900° C. and 950° C. for 3 hrs. The $CO_2$ content of the ferrous carbonate was expelled and the extruded bodies shrank to a diameter of approximately 5/32" giving catalytic bodies of apparent bulk density approximately 1.4 as determined by filling a 250 cc. graduate with the calcined bodies ¼" to 1" in length and compacting them to maximum density by tapping the graduate against a table top. The product proved to be satisfactory in catalytic activity and in strength.

Example II

The procedure of Example I can be varied by substituting for 6.75 lbs. of $Ni(NO_3)_2$, 1.5 lbs. of zinc oxide or 1.9 lbs. of $TiO_2$ or 1.9 lbs. of $V_2O_5$ or 2.0 lbs. of $MnO_2$ or 2.1 lbs. of CoO or 1.7 lbs. of NiO or 1.9 lbs. of CuO. In all these cases the catalyst will be found to have satisfactory activity. The amounts of catalytic metals can be varied as above indicated, those mentioned in this series of examples being merely illustrative.

This is a substitute for Serial No. 716,436, filed December 14, 1946, now abandoned, which is in turn a continuation-in-part of Serial No 637,112, filed December 22, 1946, now abandoned

Having thus described our invention, what we claim is:

1. An improved method for the preparation of extruded catalytic bodies, comprising the steps of forming a paste consisting essentially of ferrous carbonate, a compound of a catalytic metal of atomic number from 22 to 30 inclusive excluding iron capable of yielding the oxide thereof on calcination, a compound of an alkali metal capable of yielding the oxide on calcination and water, the proportions being such that after calcination the product will consist essentially of from 2% to 30% of the oxide of said catalytic metal and up to 28% of the oxide of said alkali metal but not less than 70% of iron oxide, percentages being based upon the total weight of the final product, water being present in said paste in proportion suitable for extrusion, extruding said paste to form catalytic bodies of the desired size and shape, heating the resulting extruded bodies at temperatures of the order of 110° C. to 150° C. until uncombined water has been removed and then calcining at temperatures of the order of 900° C. to 950° C. for from 2 to 6 hours.

2. A method according to claim 1 wherein the compound of a catalytic metal is a nickel compound capable of yielding nickel oxide on calcination.

3. A method according to claim 1 wherein the compound of a catalytic metal is a cobalt compound capable of yielding cobalt oxide on calcination.

4. A method according to claim 1 wherein the compound of a catalytic metal is a copper compound capable of yielding copper oxide on calcination.

PAUL R. PINE.
EARL C. RAY.

REFERENCES CITED

The following references are of record in the file of this patent:

UNITED STATES PATENTS

| Number | Name | Date |
| --- | --- | --- |
| 2,408,140 | Gutzeit | Sept. 24, 1946 |
| 2,419,255 | Dely | Apr. 22, 1947 |